United States Patent [19]

Buchanan

[11] 4,427,292

[45] Jan. 24, 1984

[54] COMPUTER CONTROLLED MICROFILM CAMERA SYSTEM

[75] Inventor: Vernon G. Buchanan, Salt Lake City, Utah

[73] Assignee: Microsize, Inc., Salt Lake City, Utah

[21] Appl. No.: 372,825

[22] Filed: Apr. 28, 1982

[51] Int. Cl.³ .............................................. G03B 27/44
[52] U.S. Cl. ....................................... 355/54; 355/77; 364/525
[58] Field of Search ....................... 355/39, 41, 53, 54, 355/77; 364/525

[56] References Cited

U.S. PATENT DOCUMENTS

| | | | |
|---|---|---|---|
| 3,288,025 | 11/1966 | Litz et al. | 355/41 |
| 3,563,648 | 2/1971 | Baggaley et al. | 355/53 X |
| 3,704,946 | 12/1972 | Brault et al. | 355/53 X |
| 4,123,157 | 10/1978 | Klose et al. | 355/54 X |
| 4,174,174 | 11/1979 | Hunter, Jr. et al. | 355/54 X |
| 4,225,225 | 9/1980 | Hyatt | 355/53 X |
| 4,286,864 | 9/1981 | Lysle et al. | 355/41 X |
| 4,344,701 | 8/1982 | Klose et al. | 355/54 X |

Primary Examiner—Richard A. Wintercorn
Attorney, Agent, or Firm—Rick D. Nydegger; Drew S. Hamilton; Ross Workman

[57] ABSTRACT

A computer controlled microfilm camera system and method for microfilming data onto pre-cut individual microfiche film sheets in one of a plurality of formats selected by a system user. The camera system includes a reusable cartridge which permits the single microfiche film sheet to be substantially withdrawn and exposed, and then reinserted into the cartridge for processing in a daylight loading processor. The cartridge is supported on a movable carriage assembly which is connected to a first drive system and stepping motor so as to provide for translation of the film sheet in a column direction. The carriage assembly supports a second drive system and stepping motor which is connected so as to provide for translation of the film sheet in a row direction. A pre-programmed microprocessor controls the incremental stepping of the film sheet in directions determined in response to format selection data input to the microprocessor by a system user, identifying one of a plurality of format tables stored in the microprocessor. The microprocessor additionally controls the order of movement of the film sheet in order to expose the film in either a row mode or a column mode as specified by the user.

26 Claims, 15 Drawing Figures

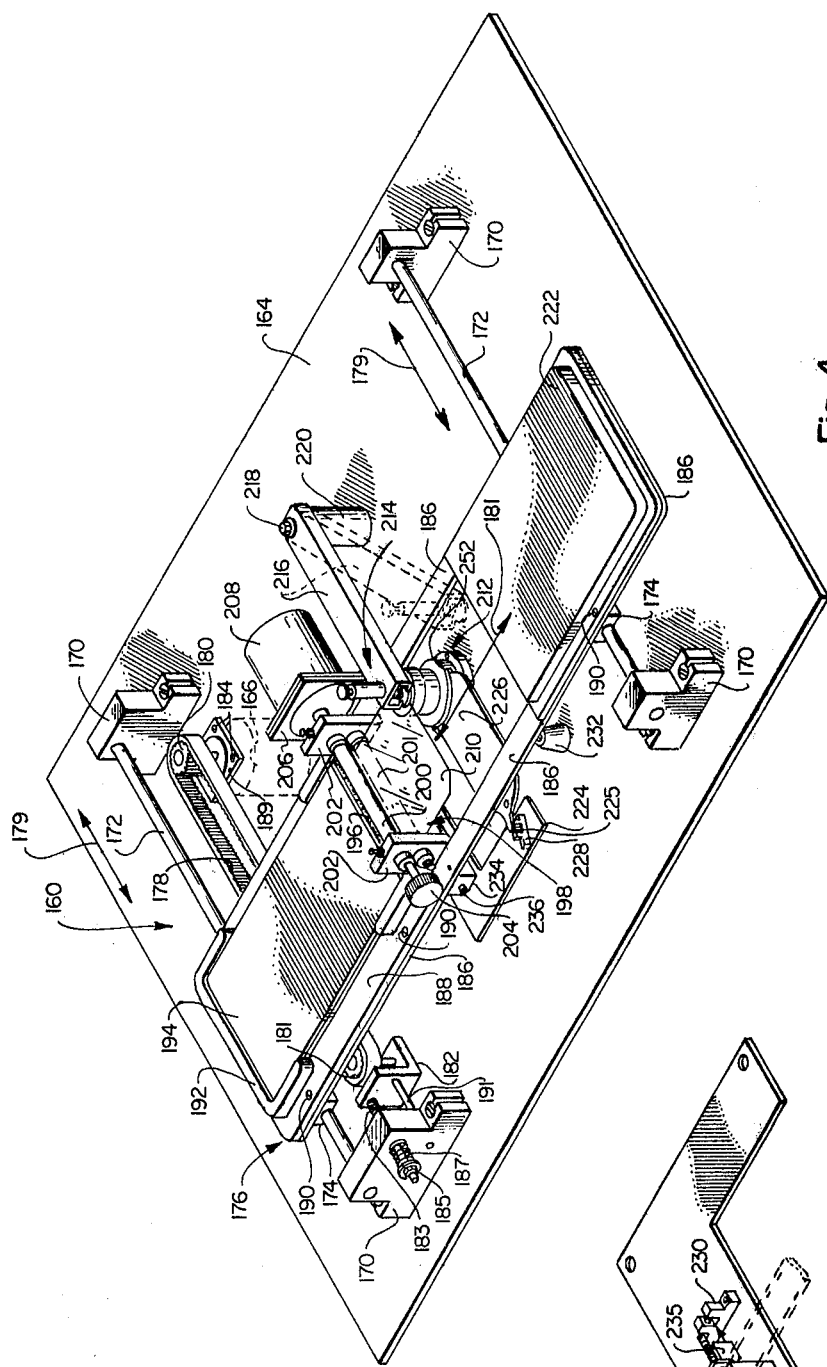
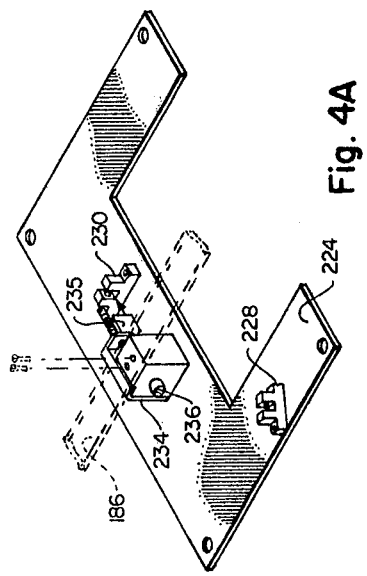
Fig. 4
Fig. 4A

COMPUTER CONTROLLED MICROFILM CAMERA SYSTEM

BACKGROUND

1. Field of the Invention

The present invention relates to microfilm cameras and, more particularly the present invention relates to a computer controlled microfilm camera system and method providing the capability of automated format selection and row or column mode operation for microfilming data onto pre-cut individual microfiche film sheets.

2. The Prior Art

Microfilm camera systems have long been used for producing very small film copies of documents or data. When it is developed the exposed roll of microfilm is cut into sheets, called microfiche, which are typically 105 mm by 148 mm (approximate 4½ inches by 6 inches) in size. In the most common format, 98 separate exposures may be stored on a single microfiche.

In the past, the prior art camera systems used rolls of microfilm that were commonly 100 feet in length. Thus, before developing, each roll contained over 19,000 individual exposures. Although such systems are valuable in applications where large numbers of documents are to be microfilmed over a relatively short period of time, these systems are simply unacceptable for the small volume user who may wish to record only a few documents and to produce only several microfiche in a short time period. The roll system is not economically adaptable for that purpose since it is not possible to produce single microfiche without losing in excess of 6 feet off the roll of microfilm each time that is done. Thus, the user must wait until the entire roll has been exposed in order to eliminate such waste.

In order to meet the need of the small volume user, several microfilm camera systems have been developed for copying documents onto a single, pre-cut sheet of microfilm. In such systems, the microfilm sheet is typically contained in a cartridge that is loaded into the camera prior to exposure of the film. In one instance, the cartridge has a face plate which is removed after the cartridge is in the camera. After exposure of the film, and prior to removing the cartridge from the camera, the face plate is replaced on the cartridge.

Another known type of camera system for small volume users involves use of a cartridge from which the microfilm sheet is completely removed while the cartridge and sheet are in the camera. After exposure the microfilm sheet is placed into a second "holding cartridge" in preparation for processing.

Although these prior art camera systems provide a means by which the small volume user may economically produce individual microfiche, they are not entirely satisfactory for a number of reasons.

One of the foremost problems with such camera systems is that the user is restricted to producing microfiche in only a single format. In other words, even though the user may be filming documents of various sizes, he can only produce microfiche of a particular frame size, with a set number of rows and columns per microfiche. This results in an inefficient use of film for many users. And if a different format is required, it has been necessary to utilize a different camera system, which increases both the expense and inconvenience to the user.

Another difficulty of the single sheet camera systems developed for small users is that they typically record the microfilmed data in only a single mode—i.e., either row by row (row mode), or column by column (column mode). In some applications it is desirable to be able to change the mode of recording data from row mode to column mode or vice versa.

Yet another problem with the present microfiche camera systems concerns the processing of the exposed film. In microfilm camera systems which use rolls of film, the exposed film is collected in a lightproof canister which may be removed from the camera and loaded into one of several types of well-known daylight loading processors which are commercially available. In this type of processing, the film is fed directly from the canister into the processor which then develops the film to produce the finished microfiche.

To date, the microfilm camera systems that have been developed for use with single, pre-cut film sheets have not been usable with daylight loading microfilm processors. For example, in the case where the film cartridge has a removable face, it is impossible to unload the exposed film from the cartridge into such a daylight loading processor. It has also not been possible to load the exposed film from a "holding cartridge" type camera system into a daylight loading processor. In each of these two cases, the exposed film must be processed in a darkroom or similar environment. Thus, the low volume user who desires to produce single microfiche with a fairly quick turnaround must either provide his own darkroom processing facilities, or he must be prepared to spend additional time and money to have the microfilm processed commercially.

What is needed in the art is a microfilm camera system designed for use with pre-cut, single microfiche film sheets and which offers the user a multiplicity of formats from which to choose, as well as permitting the user to specify row or column mode operation. It would be a further important advance in the art to provide a system wherein each film sheet can be retrieved from the camera system after exposure and immediately process in a daylight loading processor, with no darkroom or similar handling required. Such an invention is described and claimed herein.

BRIEF DESCRIPTION AND OBJECTS OF THE INVENTION

The computer controlled microfilm camera system and method of the present invention are designed for use with single pre-cut microfiche film sheets in reusable cartridges. Each cartridge is placed on a movable carriage assembly, and the end of the sheet of film is secured between two rollers. The rollers are connected to a first drive system which includes an electric stepping motor, while the carriage assembly is connected to a second drive system and stepping motor. The first drive system is utilized in conjunction with the rollers for translating the microfilm in incremental steps along a first direction corresponding to rows, while the second drive system is utilized in conjunction with the movable carriage assembly so as to translate the microfilm in incremental steps along a second direction corresponding to columns. The size of the incremental steps is controlled by a pre-programmed microprocessor in response to format selection data input to the microprocessor by a system user. The format selection data identifies one of a plurality of format tables stored in the microprocessor memory. Each format table defines the spacing between rows and columns for the exposures on a given sheet of film. The microprocessor additionally controls the order of movement of the microfilm in order to expose the film in either a row mode or a column mode in response to mode selection data input to the microprocessor by a system user.

During exposure, a portion of the microfilm is secured adjacent to the camera lens assembly by pressure from a solenoid-operated platen positioned in approximate alignment with the central axis of the lens. The lens assembly itself remains fixed throughout camera operation; however, the lens may be readily removed from the system and replaced with another pre-focused lens without disassembly of any other components of the camera system.

After its exposure the sheet of film is automatically reinserted into the cartridge which may then be removed from the camera system and the film may be immediately unloaded from the cartridge directly into a daylight loading processor for development.

It is therefore a primary object of the present invention to provide a novel computer controlled microfilm camera system and method for simply and efficiently producing single microfiche in a format selected by the user from among a multiplicity of choices.

Another primary object of the present invention is to provide a computer controlled microfilm camera system and method for exposing single microfiche in either a row mode or a column mode as selected by a user.

A further object of the present invention is to provide a reusable, single microfilm cartridge, for use with a computer controlled microfilm camera system such that the microfilm may be at least partially withdrawn from the cartridge so as to permit exposure thereof, and for permitting the microfilm to be reinserted into the cartridge when its exposure is finished, thus permitting the microfilm to be processed in a daylight loading processor.

These and other objects and features of the present invention will become more fully apparent from the following description and appended claims taken in conjunction with the accompanying drawings.

BRIEF DESCRIPTION OF THE DRAWINGS

FIG. 4 is a perspective illustration of the carriage assembly and related mechanical components used for imparting translational movement to the cartridge and film sheet.

FIG. 4a is a an enlarged perspective illustration of the shutter board assembly 224 of FIG. 4.

DETAILED DESCRIPTION OF THE PREFERRED EMBODIMENTS

Reference is now made to the figures wherein like parts are designated with like numerals throughout.

Figure 1:
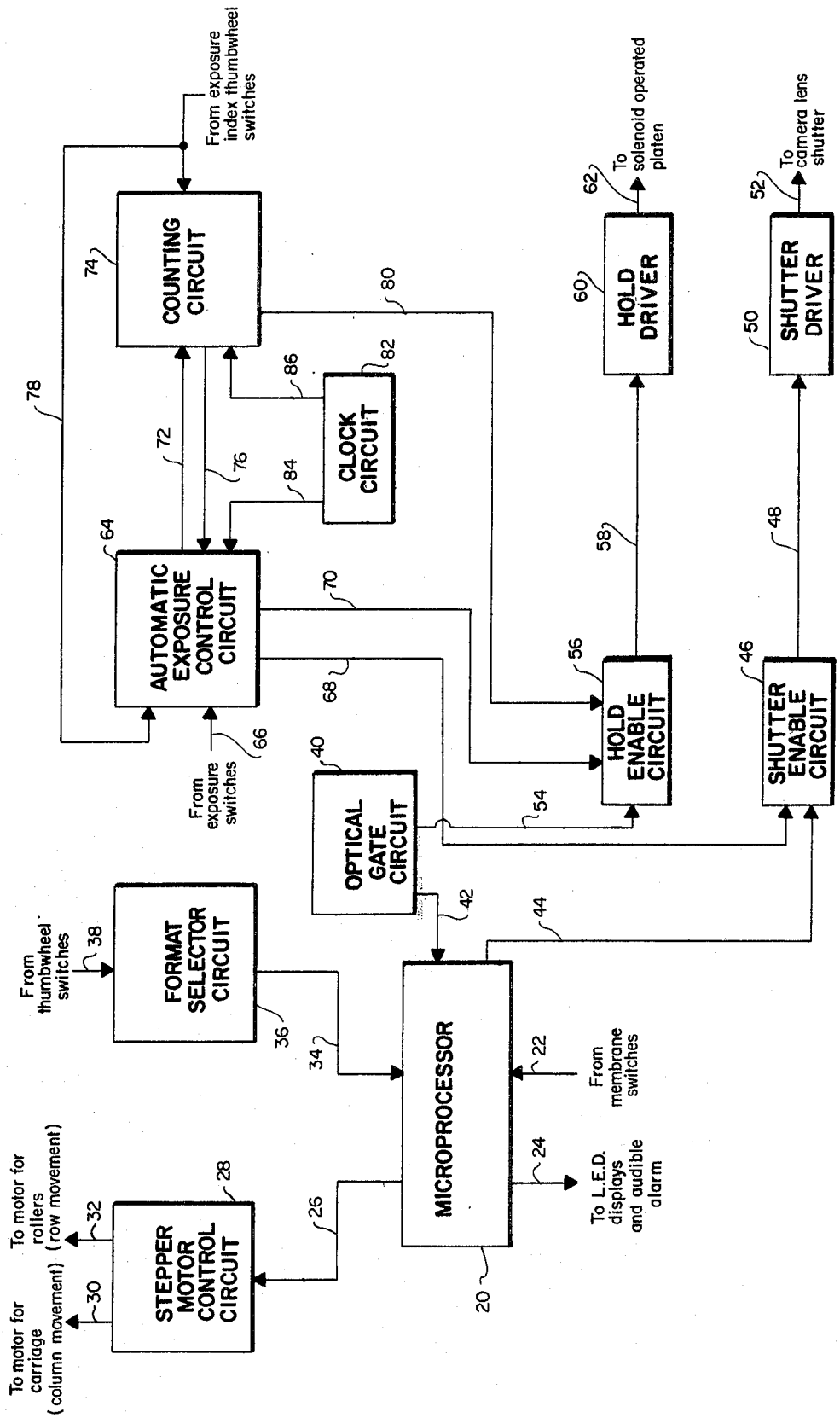
FIG. 1 is a block diagram generally illustrating the components of the computer controlled microfilm camera system of the present invention.

The principal components of the computer controlled microfilm camera system of the present invention are generally illustrated in the block diagram of FIG. 1. As schematically represented in FIG. 1, a microprocessor 20 is connected (see line 22) to an input device which, in the illustrated embodiment, consists of a number of membrane switches that may be operated by a system user as more fully described below. Microprocessor 20 is additionally connected (see line 24) to output devices comprised of light emitting diodes (LEDs) and an audible alarm. The microprocessor 20 may be any one of several types of well-known commercially available microprocessors, as for example the Mostek MK38P70 microprocessor.

Microprocessor 20 is also connected (line 26) to a stepper motor control circuit 28 which comprises a driver for controlling (line 30) the motor of a movable carriage assembly. Stepper motor control circuit 28 similarly drives (line 32) the motor of a pair of rollers. As hereinafter more fully described, the movable carriage assembly and rollers are used to impart translational movement to the sheet of microfilm along directions corresponding to columns and rows, respectively, as each exposure is taken.

Microprocessor 20 is additionally connected (line 34) to a format selector interface circuit 36 which acts as a buffering and decoding circuit for signals received (line 38) from thumbwheel switches operated by the system user. The thumbwheel switches are used to select a particular format for recording the film explosures. As hereinafter more fully explained, the user may select from a number of formats that are pre-programmed into the microprocessor's memory.

Optical gate circuit 40 provides information to the microprocessor (line 42) regarding whether the shutter of the camera is open or closed, as well as providing data regarding the position of the movable carriage assembly of the camera system. Microprocessor 20 is also connected (line 44) to shutter enable circuit 46 which in turn controls (line 48) the shutter driver circuit 50. The shutter driver circuit 50 is connected (line 52) to the lens shutter, which it controls for purposes of opening and closing of the shutter.

Optical gate circuit 40 is also connected (line 54) to hold enable circuit 56 such that when the lens shutter is open, hold enable circuit 56 is caused to transmit a signal (line 58) to hold driver circuit 60. Driver circuit 60 activates (line 62) a solenoid-operated platen, as more fully described below, for purposes of securing the sheet of film during the period of time that the film is being exposed.

An automatic exposure control circuit 64 automatically controls the exposure time of the microfilm. Circuit 64 is connected to an exposure switch operated by the system user. Control circuit 64 is also connected (line 68) to the shutter enable circuit 46, as well as to the hold enable circuit 56 (line 70). Exposure control circuit 64 transmits (line 72) enable signals to a counting circuit 74.

Both the exposure control circuit 64 and the counting circuit 74 are connected (line 78) to an exposure index thumbwheel switch, also operated by the system user. The thumbwheel switch defines an upper limit in counting circuit 74 corresponding to an approximation of the average exposure time for the particular type of film in the camera system. The signal on line 78 also acts as an enable signal transmitted (line 68) from control circuit 64 to shutter enable circuit 64 for causing the closing of the camera lens.

Counting circuit 74 is connected (line 80) to hold enable circuit 56 so that upon receiving an enable signal from control circuit 64, counting circuit 74 may transmit a signal to hold enable circuit 56 enabling actuation of the driver circuit 60. A signal causing initiation of exposure is transmitted (line 76) from counting circuit 74 to exposure control circuit 64.

A clock circuit 82 includes a light sensing device which varies the frequency of clock signals in accordance with surrounding light intensity. These clock signals are utilized to control timing of the exposure control circuit 64 and the counting speed of counting circuit 74 such that the exposure time may be varied in response to the light intensity detected by clock circuit 82.

Figure 2:
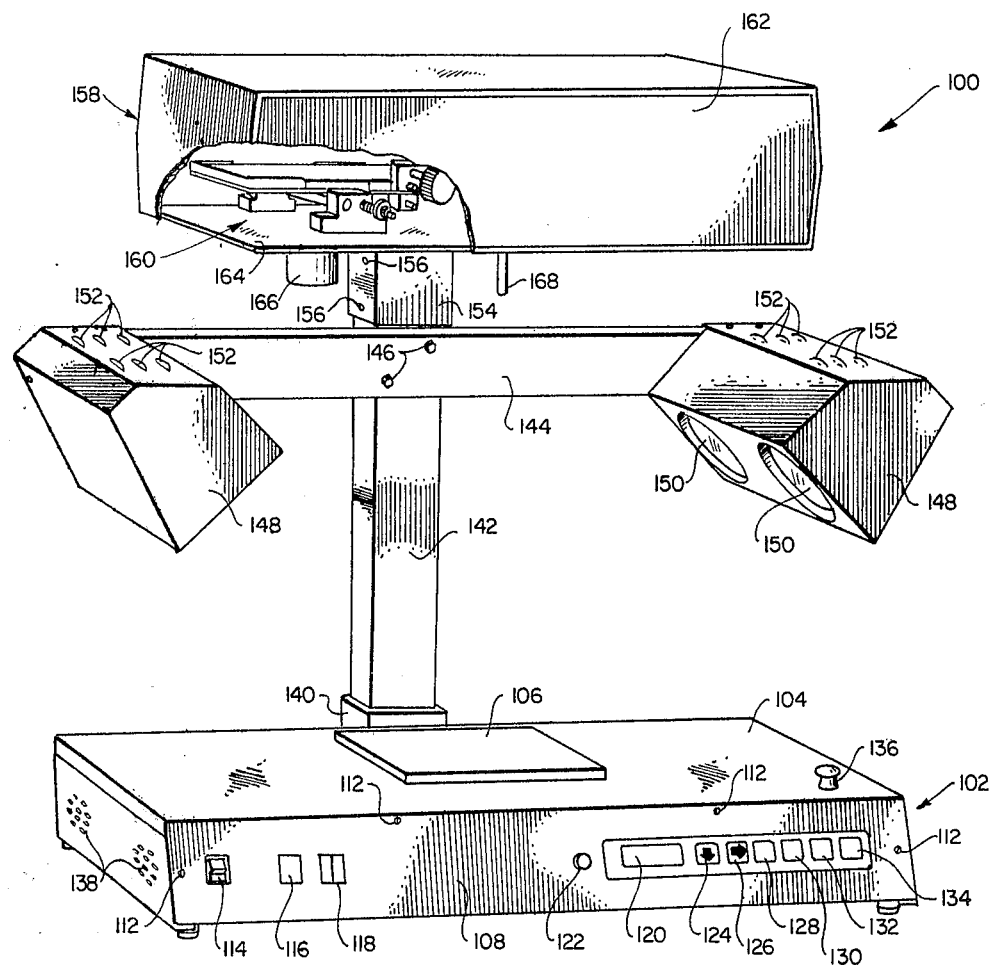
FIG. 2 is a perspective view of one preferred embodiment of the computer controlled microfilm camera system of the present invention, with a portion of the camera head broken away to partially reveal the mechanical components contained therein.

Attention is next turned to FIG. 2, which illustrates one presently preferred configuration of the mechanical components controlled by the microprocessor and electronic circuitry generally illustrated and described in FIG. 1. It will of course be readily appreciated that the system components of the present invention as generally illustrated and described with the foregoing FIG. 1 could be arranged and designed in a wide variety of different configurations. Thus, the following more detailed description of the embodiment of the system and method of the present invention as represented in FIGS. 2-13 is merely representative of one presently preferred embodiment of the invention.

Referring particularly to FIG. 2, the microfiche camera system is generally designated at 100. Camera system 100 includes a base section 102 which acts both as a housing for the electronic circuitry (see also FIG. 3) and as a copy table. The upper surface 104 of base section 102 is substantially horizontal so as to provide support for documents and things to be filmed. Positioned upon upper surface 104 is a copy board 106 designed for providing support and proper positioning for the copies to be photographed. Preferred embodiments of a copy board and the means for aligning it on surface 104 are illustrated and described in the drawings and specification of U.S. Pat. No. 4,097,143 to Buchanan et al., which is incorporated herein by reference.

Figure 3:
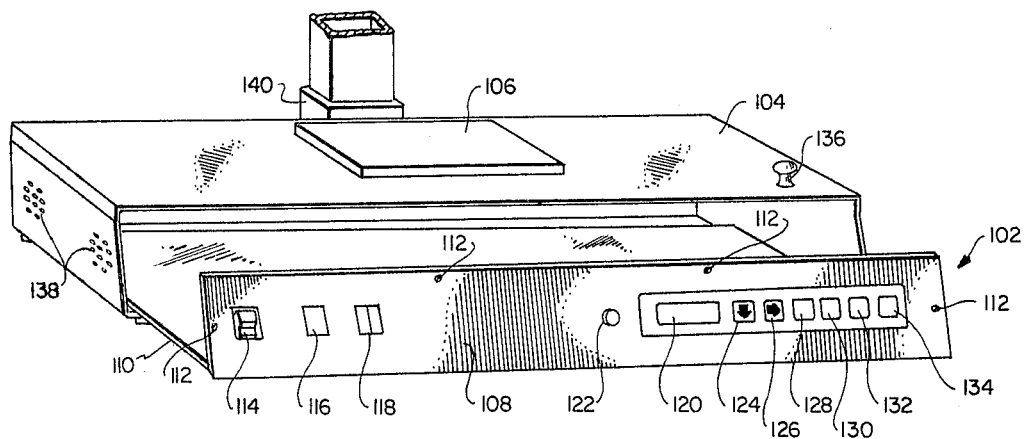
FIG. 3 is a perspective view of the lower portion of the camera system illustrating the drawer in which the electrical components are housed.

By reference to FIG. 3 it may be seen that base section 102 includes a front panel 108 which also comprises the front panel of a drawer 110. Front panel 108 may be pulled forward from the body of base section 102 so as to expose drawer 110. The electronic circuitry for controlling the camera system 100 is secured within drawer 110 and electrically connected to a series of control switches positioned upon panel 108, as described more fully below. Front panel 108 is secured to the base section 102 by screws 112.

Mounted on panel 108 is a power switch 114 which permits the camera system to be turned on or off by the user. An exposure index 116 is comprised of a thumbwheel switch positioned on panel 108. By use of thumbwheel switch 116, data relating to the film speed (ASA) of the microfilm may be input into the camera system. Thus, the exposure index assists in matching the relative exposure time to the film processing and/or ambient light requirements. The system is designed so that the lower number settings will cause a lower exposure time period than will the higher number settings.

A format selector 118 comprised of a two-digit thumbwheel switch is also provided on panel 108. Through use of the format selector, the user may choose from a plurality of different formats which have been pre-programmed into the microprocessor memory (not shown). Each format varies the spacing between rows and columns of the film exposures. In a preferred embodiment of the invention, 94 different formats are programmed into the memory. However, the system may be designed so that any number of formats may be stored therein.

A frame counter 120 is comprised of a numerical display positioned on panel 108 so as to indicate the number of the frame that is about to be exposed. This counter is automatically reset to one when a new cartridge is loaded into the camera system, and the number is increased when advancing the frame to the next frame in a column or row.

A fault indicator 122 is comprised of a lamp positioned on panel 108. When a fault condition occurs, indicator 122 will light and all camera functions will disengage. Faults may occur when: (1) the film is exposed for a period longer than a limit which is pre-programmed into the camera system memory, or (2) when format selector 118 is set to a number which does not correspond to one of the formats stored in the camera system memory.

A row advance switch 124 comprised of a pressure sensitive membrane is also provided on panel 108. For reference purposes, rows are defined horizontally across the microfiche from left to right, while columns extend vertically from top to bottom. Thus, activating switch 124 causes the microfilm to advance to the next row without an exposure, such that the next frame subject to exposure is in the same column and one row closer to the bottom of the film sheet. When the last row is reached, pressing this switch will position the film at an index frame, as explained hereafter.

When the camera system 100 is operating in the row mode (exposing each frame in a particular row before moving to the next row), activating switch 124 will cause the camera system to skip the remaining frames in the row and to advance to the corresponding frame in the next row. However, if the system is operating in a column mode (exposing each frame in a particular column before moving to the next column), activating row advance switch 124 will simply advance the film to the next frame in the same column. The number appearing on frame counter 120 will correctly reflect the new position of the film in accordance with whether the system is in the row mode or the column mode.

Similar to the row advance switch 124, a column advance switch 126 is also provided on panel 128 and is comprised of a pressure sensitive membrane. Activating switch 126 causes the film to advance to the next column, while remaining in the same row, without exposing the film. As explained above, the effect of this move is different depending on whether the system is operating in the row mode or column mode. If operating in the row mode, this move merely advances the film to the next frame. If operating in the column mode, this move causes the camera system to skip exposure of the remaining frames in that column and to advance to the corresponding frame in the next column. When the last column is reached, activating switch 126 will position the film at an index frame as explained hereafter.

Also provided on panel 108 is a load switch 128 comprised of a pressure sensitive membrane. After a film cartridge is loaded into the camera, activating switch 128 will cause the sheet of film to advance so as to present the first frame of the first column or row for exposure. After this load function has been completed, load switch 128 is disabled for the remainder of the filming operation.

Panel 108 also includes an exit switch 130 comprised of a pressure sensitive membrane. Activation of switch 130 advances the film to an index position. In the index position, the last frame of the selected format is presented for exposure, thus permitting the photographing of an index page describing the other documents which have been recorded on the microfiche.

An index switch 132 is also provided on panel 108, and is similarly comprised of a pressure sensitive membrane. Switch 132 controls the index frame on the sheet of film. During filming, when the last frame is ready for filming, all camera functions become locked. This indicates to the operator that the last frame has been reached. The system will not permit the last frame to be exposed until after the index switch 132 has been pressed. If the index frame is not to be exposed, after activating the index switch 132, activation of the exit switch 130 will cause the camera system 100 to reinsert the sheet of film back into the reuseable cartridge.

Fault reset switch 134, comprised of a pressure sensitive membrane, is also located on panel 108. When fault indicator 122 is lit, all camera functions will disengage. If the fault indicator 122 is lit because the shutter has been held open for an excessive period, then by activating the fault reset switch 134 camera functions can be restored and filming may continue. If the fault indicator 122 is lit because the format selector has been set to an invalid format number, the fault cannot be corrected by depressing fault reset switch 134. To correct this problem, the camera system must be turned off by switch 114, the format selector 118 must be turned to a valid format number, and then the camera must be turned back on by switch 114.

With continued reference to FIGS. 2 and 3, positioned on upper surface 104 is an exposure button 136. Activation of button 136 causes the camera system 100 to expose the current frame and then to advance the film to the next frame. Exposure button 136 is only operable after the film has been loaded by depressing the load switch 128.

The panels at each end of base section 102 contain air slots 138 for cooling the interior of base section 102, which contains the electronic circuit components in drawer 110. Secured at the rear of base section 102 is a column support 140 configured to receive a column 142 which extends substantially vertically upward therefrom. Affixed to the forward side of column 42, near its upper end, is a support bar 144. Support bar 144 may be secured by any conventional fastening means such as by screws 146. Positioned on the forward side of each end of support bar 144 are light fixtures 148. Fixtures 148 are oriented so as to direct a significant portion of their light onto the copy board 106. Typically, each light fixture houses two 75 watt reflector flood lamps 150, although other light sources could be utilized with acceptable results. On the top surface of each light fixture 148 are a series of air slots 152 for purposes of cooling the lamp fixtures.

Secured to the top end of column 142 is a camera head mounting bracket 154. Stability of bracket 154 is maintained by securing that bracket to the column 142 by common securing means such as screws 156. Affixed to the top of mounting bracket 154 is camera hood 158 within which is positioned the camera equipment generally designated at 160. Hood 158 is configured so as to preclude substantially all light from entering therein during camera operation. The front panel 162 of hood 158 is hingedly mounted along its bottom edge to permit it to swing outward, thus providing access to the mechanical camera equipment contained inside of the hood 158. The bottom surface of hood 158 comprises a platform 164 upon which the camera equipment 160 is secured.

Extending through an aperture (not shown) in platform 164 is a cartridge assembly drive motor 166 having a use in conjunction with the camera equipment as more fully explained hereafter. Also extending through an aperture (not shown) in platform 164 is a hollow tube 168 within which is positioned a light sensing apparatus such as a photocell. Hollow tube 168 is oriented such that its axis is aligned substantially normal to the surface of copy board 106 in order to permit the light sensing apparatus to monitor the intensity of light at board 106. Any of numerous commercially available light sensing apparatus may be utilized, one such device being a Clarex photocell, part No. CL-940L.

FIG. 4 illustrates more particularly the mechanical camera equipment used in the system of the present invention. Positioned upon the top surface of platform 164 are four brackets 170, each having an aperture so as to receive one of two case-hardened rods 172. Rods 172 are oriented so that they run parallel to one another. Disposed upon each rod 172 are two linear bearings 174, two of which are partially shown in FIG. 4. These bearings are affixed to the base of a carriage assembly generally designated at 176. Bearings 174 provide a slide-type journal support for the carriage assembly 176 relative to the rods. Thus, the carriage assembly 176 is free to slide back and forth along rods 172, as schematically represented by arrows 179, under control of the drive motor 166 as hereinafter described. Bearings 174 may be comprised of any conventional bearings such as Thompson Bearing A-61014, ⅜ inch nominal shaft diameter.

Carriage assembly 176 is additionally connected on its underside to a drive belt 178 which is positioned so as to travel about two sprockets 180–181. Sprockets 180–181 are positioned near brackets 170, and are oriented so that the length of drive belt 178 is parallel to rods 172. Sprocket 180 is rotatably secured to the shaft of stepping motor 166 so as to maintain a fixed axis position. The other sprocket 181 is mounted to an L-shaped tension block 182. Block 182 is in turn attached to a threaded rod 183 which extends through the mounting bracket 170. A spring 187 is placed over the end of rod 183 and is retained by a washer nut 185. In this manner the tension on drive belt 178 may be adjusted by adjusting the tension of spring 187. Tension block 182 is also attached to one end of a slidable guide rod 191. The other end of guide rod 191 is slidably mounted through the mounting bracket 170.

The base plate 189 of carriage assembly drive motor 166 (shown in dashed lines) is mounted to the top side of platform 164. The rest of motor 166 extends through an aperture in platform 164. Motor 166 is axially secured to the shaft of sprocket 180, and may comprise a SLO-SYN Synchronous Stepping Motor, Model No. MO 52-FD03, made by the Superior Electric Company of Bristol, Conn.

The carriage assembly 176 is comprised of a rectangular metallic frame 186 mounted to the top of bearings 174. A cartridge cradle support member 188 is secured to the frame around its periphery by conventional securing means such as screws 190. Cartridge support 188 is preferably constructed of a plastic material such as ABS which is molded so as to define shoulders 192 for conformably receiving and securing a microfiche cartridge as illustrated at 194 and more fully described hereafter. A gap is provided in the midsection of cartridge shoulders 192 along both sides thereof so as to permit finger access to cartridge 194.

On the forward end of cartridge support 188 is positioned an upward extending lip (not shown) upon which is secured a strip of antistatic material 196 comprised of any of numerous well-known products for removing static, such as conductive foam or the like. The foam 196 prevents static build-up on the sheet of film 210 as it is pulled through rollers 200–201 which are positioned adjacent the forward end of cartridge support 188. The roller assembly, generally designated at 198, includes a steel roller 200 and a roller 201 made of rubberized material, such as neoprene. The rollers 200–201 are positioned in parallel and are closely aligned along their longitudinal surfaces. Rollers 200–201 are attached at both ends to mounting plates 202 which are themselves affixed to the sides of frame 186. A roller knob 204 is mounted on an exterior side of one of the mounting plates 202 to an extended axis of one of the rollers 200. Thus, the roller assembly 198 may be manually operated by rotation of roller knob 204.

A motor mounting plate 206 is also secured to the side of frame 186 so as to be in parallel alignment to the mounting plates 202 and on the opposite side of frame 186 from roller knob 204. A drive motor 208 is fixedly mounted to the outside surface of mounting plate 206. The shaft of motor 208 extends through an aperture in plate 206 and is axially connected to an extended axis of one of the rollers 200. By this means, roller assembly 198 may be electronically driven through operation of drive motor 208, which, in the illustrated embodiment, is a SLO-SYN Synchronous Stepping Motor, Model No. NO52-FD03, manufactured by the Superior Electric Company of Bristol, Conn.

The roller assembly 198 is oriented so that the common surfaces of rollers 200–201 are in parallel alignment with the end of the pre-cut sheet of film 210 which extends outward from the forward opening of cartridge 194. Thus, the roller assembly 198 functions as a means for grasping the sheet of film 210 and for imparting to it translational movement in the direction of arrow 181 as it is pulled through the rollers 200–201.

Motors 166 and 208 both provide 200 incremental steps per rotation in the illustrated embodiment, although the number of steps is not crucial and could be varied. As hereinafter more fully described, by controlling motors 166 and 208 the movable carriage assembly 176 and rollers 200–201 can be caused to impart translational movement to the sheet of film 210 in selected increments along two directions, corresponding to columns and rows, respectively, as schematically represented by corresponding arrows 179 and 181.

After the film 210 is pulled through the rollers 200–201, it passes over a lens assembly generally indicated at 212. Lens assembly 212 is secured upon platform 164 by any conventional means so as to be in alignment with an aperture (not shown) in platform 164 which permits light to pass therethrough. Lens assembly 212 is positioned so as to be in alignment with the copy board 106 of FIG. 2. The components of lens assembly 212 will be more fully described hereinafter in conjunction with FIG. 5.

Positioned directly above the lens assembly 212 is a solenoid-operated platen generally indicated at 214. Platen 214 is used to secure the film 210 against the lens assembly 212 as it is exposed to video images, and to maintain the position of the film during exposure. The construction of platen 214 will also be more fully described in conjunction with FIG. 6.

The solenoid-operated platen 214 is affixed to the forward end of an arm member 216 which is rotatably attached at its other end to a support cylinder 220 by a bolt 218. Arm member 216 and support cylinder 220 are preferably constructed of aluminum, although other suitable materials could also be utilized.

Since arm member 216 is rotatably attached to the support cylinder 220, the arm member 216 may be rotated so as to move the solenoid-operated platen 214 from over the lens assembly 212 to a position such as that indicated by the dashed lines in FIG. 4. Through use of this feature, the platen 214 may be moved so as to permit direct access to the removeable lens components of lens assembly 212, to be described hereafter. This permits lens components to be easily interchanged.

As the sheet of film 210 is pulled further from cartridge 194, it contacts the surface of a support pad 222 which is affixed about its outer periphery by conventional means to the upper surface of frame 186. Support pad 222 provides a means for supporting the film in a substantially horizontally position and for reducing oscillation or other movement of the forward end of film 210 as it extends beyond the lens assembly 212. Support pad 222 is preferably of molded construction utilizing materials substantially identical to those of microfiche cartridge support 188.

Also secured upon platform 164 is a shutter board assembly 224 and a pivotally mounted lens shutter 226. The shutter board assembly 224 can be more clearly understood by reference to FIG. 4a. The shutter assembly includes a first optical limit switch 228 configured so as to detect translational movement, and a second optical limit switch 230 positioned so as to detect movement of a vertically oriented blade 235. A suitable optical limit switch for these purposes is an MTC8 photo limit switch, manufactured by General Instruments Corp. or Monsanto Corp.

The shutter board assembly 224 is oriented on platform 164 such that, in its closed position, the extended end 225 of shutter 226 interrupts the light beam transmitted across switch 228. In this position, the other end of shutter 226 extends through a slot 252 in the body of lens assembly 212 so as to interrupt the passage of light through the lens assembly 212, thus precluding exposure of the film 210. The shutter 226 is rotatably mounted on top of an electrical solenoid (not shown) of the rotary type which is itself mounted to the surface of platform 164 by conventional means. A suitable solenoid is a "Ledex" solenoid, part no. H-1079-037, Catalog C-1000, manufactured by the Ledex Company of Dayton, Ohio. When moving into the open position, shutter 226 travels in a clockwise direction until stopped by the rotational limit of the rotary-type solenoid and by a rubber bumper 232, which provides a resilient limit stop to preclude unwanted vibration and damage to the shutter, as well as noise reduction. Rubber bumper 232 is mounted directly to platform 164.

When the rotary type solenoid is energized such that shutter 226 moves to the open position, light is communicated through optical limit switch 228 so as to "close" that switch, completing a grounding circuit and producing a signal which is transmitted to the microprocessor for use in a manner which will be described more fully hereafter.

In addition to the optical limit switches, FIG. 4a also illustrates a title adjustment mechanism 234 which is affixed to the lower surface of frame 186 (see FIG. 4). The title adjustment mechanism 234 includes a vertical blade 235 positioned such that during normal operation it does not extend through the slot of optical limit switch 230. However, as the carriage assembly 176 moves in the direction of arrows 179 toward the rear of platform 164, blade 235 eventually passes through the slot in optical limit switch 230 so as to block the light transmission across the slot. The interruption of light at this switch opens a circuit which causes the carriage assembly 176 to come to rest at the top of the first column of the selected format, as explained more fully hereafter. The position of the blade 235 may be varied by adjusting position screw 236, which thus permits the maximum number of rows which may be photographed to be varied. By this means, sufficient space may be reserved along the top of film 210 for later insertion of title or other information.

Figure 5:
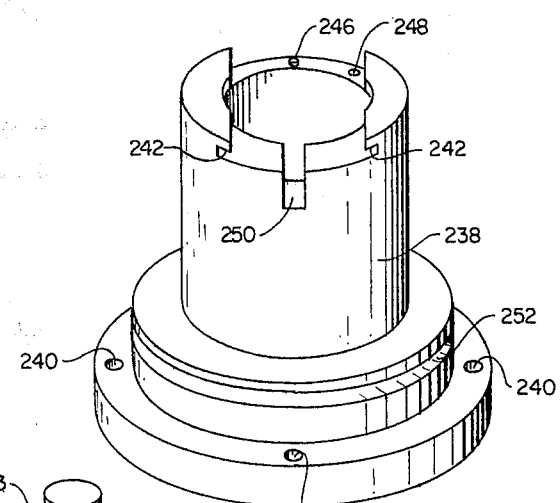
FIG. 5 is an exploded perspective view of the lens assembly of one preferred embodiment of the present invention.

Reference is next made to FIG. 5, which illustrates the lens assembly 212 in more detail. Specifically, lens assembly 212 comprises a cylindrical lens mount 238 having a throughbore for receiving a pre-focused camera lens assembly 254. A plurality of apertures 240 are positioned around the periphery of lens mount 238, near the base thereof, through which screws or other securing means may be inserted.

As previously indicated, shutter slot 252 is provided in the base of lens mount 238 so as to accommodate the rotationally displaceable shutter 226 (See FIG. 4) which extends therethrough in the closed position.

The central portion of the top of lens mount 238 is configured so as to define a slot 242 extending in a horizontal direction substantially parallel to the surface of platform 164. The slot 242 is configured so as to conformably receive a lens mask as illustrated at 244 in FIG. 6. The mask 244 is inserted horizontally through the slot 242 and contains one or more apertures 245 positioned such that when inserted in slot 242 an apperture 245 is registered so as to define a frame perimeter on the exposed film.

A lens mask stop 246 is comprised of a raised node positioned on the upper surface of lens mount 238 in the slot 242. In addition, a pressure retainer 248 comprised of a spring-loaded ball bearing is positioned in the upper surface of lens mount 238 near mask stop 246. When a lens mask is inserted into the slot 242 the pressure retainer 248 contacts the forward end of the lens mask and applies pressure thereto so as to secure the mask in position.

A lens pin notch 250 extends vertically downward in the side of the lens mount 238 at a position approximately opposite that of the lens mask stop 246. The pre-focused, drop-fit camera lens assembly 254 is provided with a pin 256 which extends outwardly from the body thereof so as to conformably fit in the notch 250 when the lens is inserted into lens mount 238. Lens pin 256 permits easy access and removal of the drop-fit lens 254, and yet the lens remains securely fixed within the camera system during operation.

The camera lens 253 is threadingly inserted into the drop-fit lens assembly 254. Lens 253 may be pre-focused by screwing it further into the assembly 254 or by unscrewing it, as needed. Once adjusted, the lens 253 remains permanently focused and yet can be easily removed and replaced by another similarly pre-focused, drop-fit lens assembly.

A lens cover 258 is provided which fits over the upper portion of lens mount 238 and restricts the movement of lens 254 within mount 238. A T-shaped slot 260 in the side of lens cover 258 is configured so as to generally correspond with the configuration of slot 242 and notch 250. When assembled, lens pin 256 projects outward from the lower notch in slot 260. Lens cover 258 additionally comprises a substantially rectangular aperture in its top surface for permitting the through passage of video images to be recorded on the exposed film 210.

Figure 6:
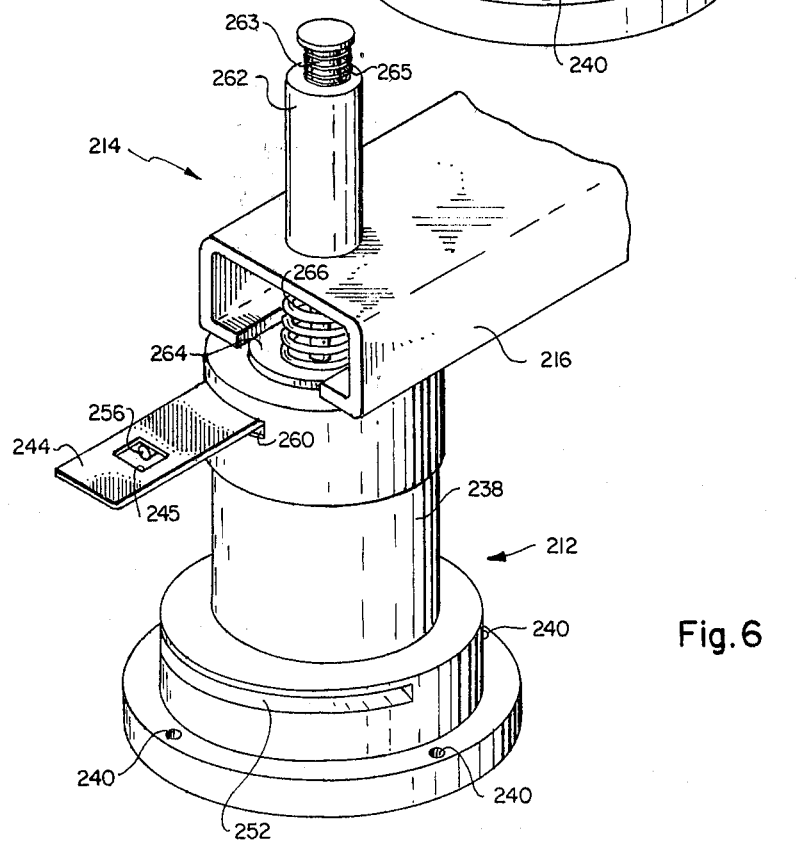
FIG. 6 is a detailed perspective view of the solenoid-operated platen in conjunction with the lens assembly of FIG. 5.

The solenoid-operated platen is more specifically illustrated in FIG. 6. The solenoid-operated platen 214 comprises a conventional pressure solenoid 262 which extends through an aperture in the forward end of arm member 216 so as to be rotatably positioned over the rectangular aperture in the top of lens cap 258. The lower end of the shaft of solenoid 262 is connected to a platen 264 of sufficient size to cover the rectangular aperture in the top of lens cover 258. Positioned on the lower shaft of solenoid 262 between the upper surface of platen 264 and the lower surface of arm member 216 is a spring 266. The spring 266 helps to keep the lower surface of the platen 264 parallel to the lens cover 258. Solenoid 262 may be any conventional pressure solenoid, such as part number CONT 12 DC6, manufactured by Guardian, Inc.

When solenoid 262 is operated, the shaft 263 compresses spring 265 so that platen 264 is forced downward until it engages and secures the sheet of film against the top of the lens cover 258. When released, the spring 265 forces the shaft 263 upward, releasing platen 264 so that the film can be advanced to the next frame.

Figure 7:
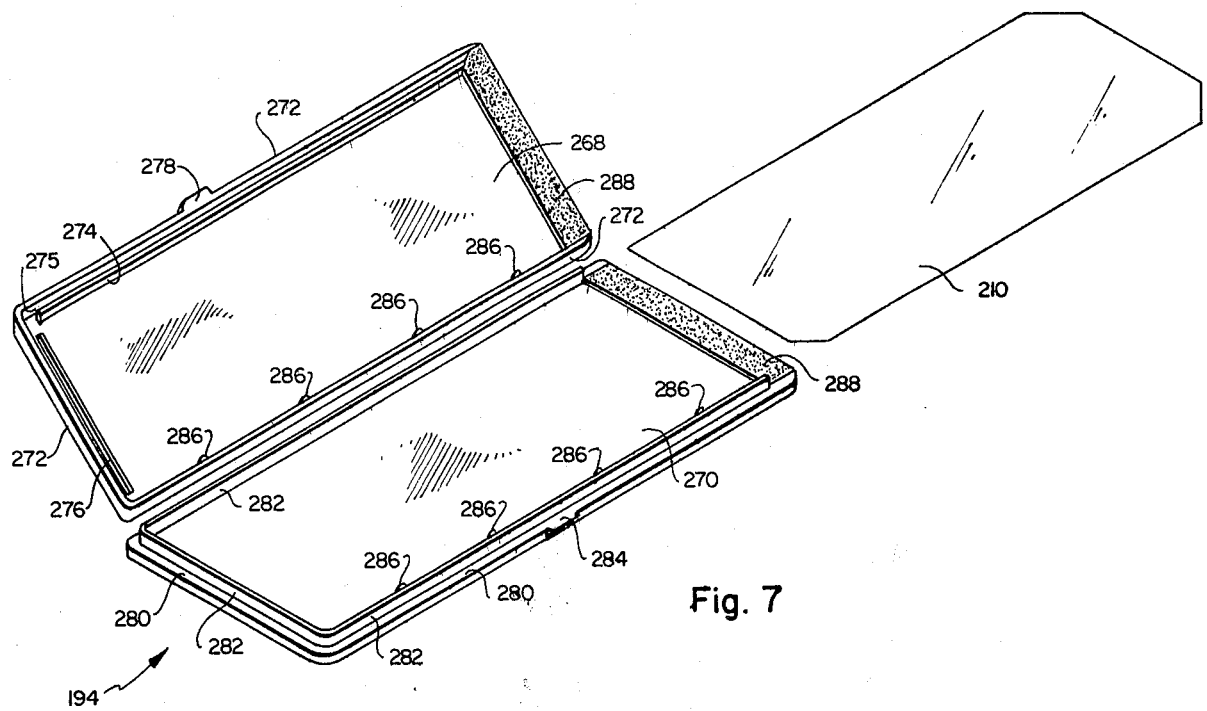
FIG. 7 is a perspective view of one preferred embodiment of the reusable microfilm cartridge of the camera system of the present invention.
Figure 8:
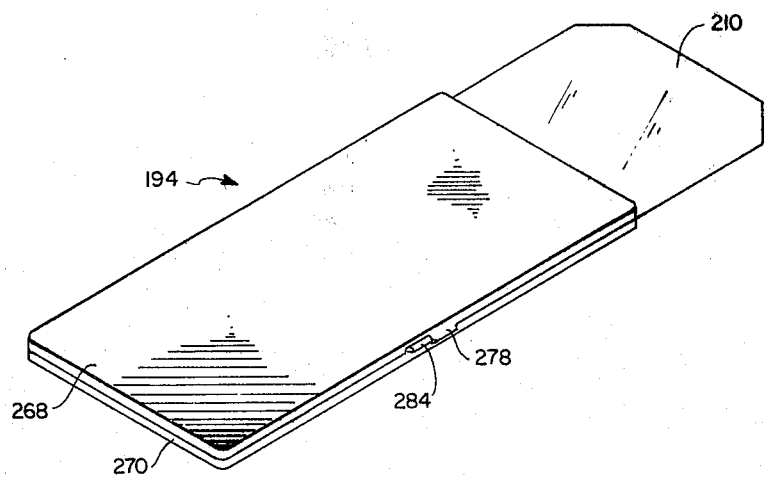
FIG. 8 is a perspective view of the reusable microfilm cartridge of the present invention in its closed configuration.

The particular features of the reusable single microfilm cartridge that is used in the camera system of the present invention may best be seen by reference to FIGS. 7 and 8. The cartridge 194 comprises a top member 268 and a bottom member 270 which is completely separable from the top member. Extending downwardly from top member 268 about its periphery is a lip 272. Additional raised strips 274 and 276 are positioned on the interior surface of top member 268 so as to extend parallel to and somewhat interior of lip 272 on the forward and end sides of the top member, thus forming a groove 275 between the respective raised strips 274, 276 and the lip 272. A finger tab 278 additionally extends forward from the lip on the forward edge of top member 268.

A lip 282 extends upwardly about the periphery of the bottom member 270. Lip 282 is configured so as to conformably fit in tongue and groove relationship in the groove 275. A finger tab 284 also extends outward from lip 280 on bottom member 270, such that when members 268 and 270 are joined (see FIG. 8), the finger tabs 278 and 284 are positioned in adjacent, offset relationship so as to provide easy opening of the cartridge 194.

The interior dimensions of cartridge 194 provide for easy insertion and removal of a pre-cut sheet of film having dimensions of approximately 105 millimeters by 254 millimeters. Such a pre-cut sheet of film is illustrated at 210 in FIG. 7.

In order to facilitate movement of the film 210 into and out of cartridge 194, rounded tabs 286 are positioned along interior sides of the lips within the cartridge so as to act as guides. Positioned along the forward end of both top member 268 and bottom member 270 are strips of material such as velvet ribbon 288. The strips of velvet ribbon 288 are precisely designed to extend a sufficient distance toward one another so as to comprise a light impervious seal, while still permitting sufficient movement of the film 210 to allow its withdrawal from and reinsertion into the cartridge 194. In its closed position, as illustrated in FIG. 8, cartridge 194 is light impervious so that the film 210 may be both loaded and unloaded into the camera system, as well as processed in a daylight loading processor, without danger of uncontrolled exposure to light.

Figure 9:
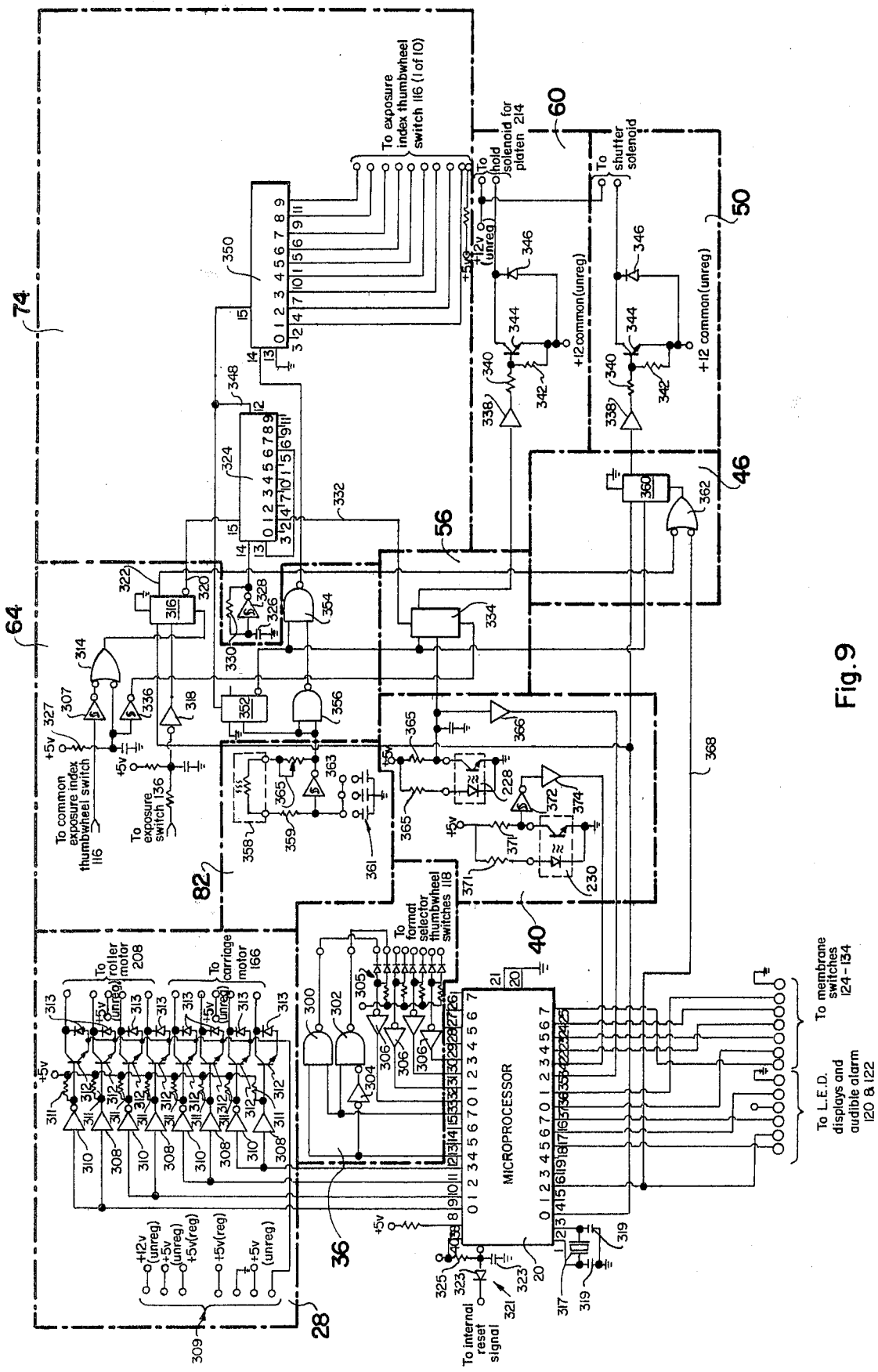
FIG. 9 is a schematic circuit diagram illustrating one preferred embodiment of the microprocessor and electronic control circuitry used in the camera system of the present invention.

Reference is next made to FIG. 9, which illustrates the schematic diagram of one presently preferred embodiment of the microprocessor and its associated electronic circuitry for controlling the camera system of the present invention. The broken line boxes of FIG. 9 correspond to the components generally illustrated and described above with reference to FIG. 1. It will of course be apparent that the schematic diagram is merely illustrative of one preferred embodiment, and could be designed in other configurations without departing from the scope of the invention.

The microprocessor 20 receives input instructions on internal pin connections 36–37 and 22–25 from the system user through the membrane switches 124–134 (see also FIG. 2) and on pin connections 12, 15 and 30–33 from the thumbwheel format selector switches 118 (FIG. 2). Inputs from the thumbwheel switches 118 are decoded from decimal to binary coded numerals by the format selector circuit 36, which, in the illustrated embodiment of FIG. 9, includes NAND gates 300, 302, inverter 304 and inverters 306, connected as shown through the resistor-diode network generally designated at 305 to the thumbwheel switch terminals. As previously indicated, various microfiche formats may be arranged by varying the spacing between exposures in the rows and columns. For example, one typical format may be comprised of 7 rows and 16 columns of frames of a size capable of recording legal size documents, thus providing 112 legal size frames per microfiche. Another format may be comprised of 11 rows and 25 columns of frames capable of recording legal size documents, thus providing 275 legal size frames per microfiche. Still another format may be comprised of 8 rows and 16 columns of frames capable of recording letter size documents, thus providing 128 letter size frames per microfiche. Each format is permanently programmed into the microprocessor and stored in memory (not shown) according to well-known, conventional programming techniques. Each format may then be identified by a particular number, which can be selected by the system user and input at the thumbwheel switches 118.

Data is output from microprocessor 20 on pins 5, 18, 17 and 16 to the LED display 120 (see also FIG. 2) and audible alarm (not shown), and on pins 9–12 to the circuitry of the stepper motor control circuit 28 and from there to the carriage assembly drive motor 166 (see also FIG. 4) and roller assembly drive motor 208. Each of the motors 166 and 208 are capable of providing anywhere up to 200 incremental steps per revolution. Based on the input received from the thumbwheel format selector switches 118, microprocessor 20 determines the number of incremental steps to be provided by motors 166 and 208 in the row and column directions so as to achieve the desired spacing for the selected format. This information is transmitted from microprocessor 20 to stepper motor control circuit 28 as a series of pulse groups. Each pulse group is comprised of four pulse train signals (output on pins 8–11) which define motor direction. The pulse groups are in turn processed through driving circuits which comprise inverters 308, 310 connected at their outputs to corresponding biasing resistors 311 and driving transistors 312. The output of each driving transistor 312 is rectified by a diode 313 at the input terminals to motors 208 and 166. The DC power supplies for operating stepper motor control circuit 28 as well as the other active components of the circuitry of FIG. 9 are indicated generally at 309, and are conventional power supplies.

The number and direction of increments between exposures along a row or column are controlled depending upon the number of pulses output from microprocessor 20. For example, if microprocessor 20 outputs a pulse train having five pulses in it to the drivers for motor 208, that motor will advance the film five increments between exposures in the row direction. Similarly, if microprocessor 20 outputs a pulse train having three pulses in it to the drivers for motor 166, that motor will advance the film three increments between exposures in the column direction. In this manner, the format of the exposures is varied according to the pre-programmed commands from microprocessor 20, which controls motors 208 and 166 in accordance with a user-selected format. Also, microprocessor 20 can control the order of movement of the film by causing either motor 208 (row movement) or motor 166 (column movement) to operate first, depending upon whether the user desires row or column mode operation of the camera system.

Timing signals for operation of microprocessor 20 are produced by an internal time base circuit which includes crystal 317 and capacitors 319. Upon turning on power switch 114 (see FIG. 2), a power-up reset circuit internal to microprocessor 20 and generally indicated at 321 initializes all outputs and internal electronics of microprocessor 20. Reset circuit 321 includes diode 323 converted in parallel with a capacitor 323 connected directly to microprocessor 20 through parallel resistor 325.

The remaining circuit elements illustrated in FIG. 9 may best be described by initial reference to the circuitry of the automatic exposure control circuit 64. From the common of exposure index thumbwheel switch 116 a signal is transmitted through a Schmitt trigger 307 onto one input of inverted OR gate 314. A constant voltage is input through resistor and capacitor combination 327 on the other input of inverted OR gate 314. When exposure switch 136 of FIG. 2 is depressed, the signal is transmitted through Schmitt trigger 318 to flip-flop 316 producing an enable signal on flip-flop outputs 320 and 322. The enable signal from output 320 is transmitted to decade counter 324 to initiate counting in that device. A constant counting time base for the counter 324 is produced by the combination of capacitor 326, Schmitt trigger 328, and resistor 330 connected as illustrated in FIG. 9.

Counter 324 provides for approximately a half second delay between operation of the hold driver circuit 60 and subsequent enabling of the shutter driver circuit 50. Thus, after the first count in counter 324 a set signal is transmitted on line 332 to flip-flop 334 to hold enable circuit 56. An enable signal is also transmitted from Schmitt trigger 336 to flip-flop 334, such that when a signal is received at flip-flop 334 from counter 324, a signal is produced by flip-flop 334 which turns on the hold driver circuit.

More specifically, when the signal is transmitted from flip-flop 334, it passes to the driver circuit 60 comprised of buffer 338, resistors 340 and 342, transistor 344, and diode 346. Thus, the circuitry of driver 60 produces a signal which is transmitted to the solenoid operated platen 214 causing that device to secure the film 210 against the lens assembly 212 during exposure.

During this time, counter 324 continues to increment, finally producing an output signal on line 348 enabling both counter 350 and flip-flop 352. When flip-flop 352 additionally receives a signal from clock circuit 82, it produces a signal which is transmitted to NAND gate 354 permitting the passage therethrough of a clock signal from clock circuit 82 through NAND gate 356. This clock signal causes operation of counter 350, which controls the time period for exposure of the microfilm 210. The clock signal received from clock circuit 82 varies in speed based on the intensity of light sensed by photocell 358 at the copy board 106 (see FIG. 2).

Photocell 358 is positioned on the base of platform 114 as previously explained so as to detect the intensity of light transmitted from the document to be photographed. The signal from photocell 358 is processed by a clocking circuit comprising resistor 359, a bank of adjustable capacitors 361 connected in shunt, Schmitt trigger 363 and trim pot 365 connected in shunt. This signal directly influences the performance of the counting circuit 350. If the document to be copied is particularly bright the clocking circuit 82 produces more frequent pulses so as to cause counter 350 to count faster and thus reduce the exposure time. On the other hand, if the document to be copied is particularly dark, the clocking circuit 82 produces less frequent pulses, thus causing counter 350 to count slower so as to increase the exposure time.

The enable signal from flip-flop 352 is additionally transmitted to flip-flop 334 where it is combined with a signal from an optical limit switch 228 connected to a voltage source through the parallel combination of resistors 365. Optical limit switch 228 produces a signal which indicates when the lens shutter 226 is open. When shutter 226 is open, the signal from flip-flop 334 continues to enable the hold driver 60 even after counter 324 has reinitialized.

The signal from flip-flop 352 is also transmitted to flip-flop 360 of shutter enable circuit 46, which also receives a signal from mircroprocessor 20. With positive signals from both microprocessor 20 and flip-flop 352, flip-flop 360 produces an enable signal which is transmitted through a driver circuit identical to driver 60 for opening lens shutter 226 so as to expose the microfilm 210.

When timer 350 counts out based on the exposure index specified by the user, a signal is transmitted through the common of the exposure index thumbwheel switch 116 through Schmitt trigger 312 and inverted OR gate 314 causing flip-flop 316 to be disabled. The output signal from flip-flop 316 indicating its disabled state is then transmitted to inverted OR gate 362 which resets flip-flop 360 and disables shutter driver circuit 50. At this point lens shutter 226 closes, and thus optical limit switch 228 determines that the switch is closed, changing the state of the signal transmitted from the optical limit switch 228. The signal from switch 228 is transmitted to flip-flop 334 which in turn removes the enable signal transmitted to hold driver circuit 60. As a result, the solenoid-operated platen 214 releases the microfilm 210 so it can be advanced to the next frame.

Upon detecting that lens shutter 226 is open, optical limit switch 228 also transmits a signal through buffer 366 to microprocessor 20. In response to this signal the microprocessor 20 initiates an internal timer typically preset in the range of two seconds. If optical limit switch 228 is still indicating that shutter 226 is open at the end of the preset period, microprocessor 20 assumes there is a malfunction and transmits a signal on line 368 to inverted OR gate 362 disabling flip-flop 360 and causing the lens shutter 226 to close. Microprocessor 20 continues to transmit the disable signal on line 368 until the fault reset 134 (FIG. 2) is depressed.

The circuitry associated with optical limit switch 230 for detecting when the carriage assembly 176 reaches a particular point includes a connection to a voltage source through parallel resistors 371. Signals indicating the status of the carriage assembly 176 are transmitted through Schmitt trigger 372 and buffer 374 to the microprocessor 20.

The method by which the microprocessor 20 is programmed is illustrated in one presently preferred embodiment by the flow charts of FIGS. 10-13. With reference initially to FIG. 10, upon receiving a start signal 400 the microprocessor moves to step 402 and transmits initialized signals to all input-output ports and internal registers. After initializing, the microprocessor moves to step 404 and reads format data received from the thumbwheel switches 118 through format selector circuit 36. The microprocessor 20 next moves to step 406 where it determines whether the selected format properly identifies one of the format tables stored in microprocessor 20. If not, microprocessor 20 passes to step 408 and produces signals disabling camera system operation, and turning on fault light 122. The microprocessor 20 then moves to step 410 and ceases operation until such time as the fault situation is corrected by turning the camera system off, inputting new format data on format selector 118, and activating the system by means of switch 114.

If the selected format number properly identifies one of the format tables the microprocessor 20 moves to step 412 wherein it initializes the timer for an external interrupt routine. As hereinafter more fully described in connection with FIG. 13, the external interrupt routine checks at each step of the main program to determine whether the main program is calling for movement of the carriage assembly or roller assembly, or for operation of the sonalert. If so, the external interrupt routine controls the stepper motors 166 and 208 or the sonalert device (not shown) as required by the main program. While the external interrupt routine is operating, the main program is halted. After the external interrupt routine completes the required task, the main program resumes. The timer (not shown) that is initialized at step 412 is internal to the microprocessor, and is set for a count down value based on the desired speed of operation for motors 166 and 208. This prevents the motors from being driven too fast or too slow. Each time the timer (not shown) counts out, the external interrupt routine checks the next step in the main program to determine whether carriage or roller movement is required, or whether a sonalert operation is required.

Microprocessor 20 next moves to step 414 wherein the format data is further analyzed to determine whether the camera system is to operate in row mode. If not, the microprocessor moves to step 416 and sets an internal flag indicating that the camera system is operating in column mode. Microprocessor 20 next moves to step 417 which is the initial step of a subroutine.

From step 417 the microprocessor 20 immediately moves to step 418 where it determines whether the lens shutter 226 was opened. If so, microprocessor 20 moves to step 420 and examines the output from optical limit switch 228 to determine if the shutter is still open. If it is, the microprocessor 20 returns to step 417 and repeats the process described above. If it is determined that the shutter is not presently open, microprocessor 20 moves to step 422 to determine whether the camera system is operating in the column mode. If it is, the microprocessor goes to the subroutine entitled column, as illustrated in FIG. 11.

Figure 11:
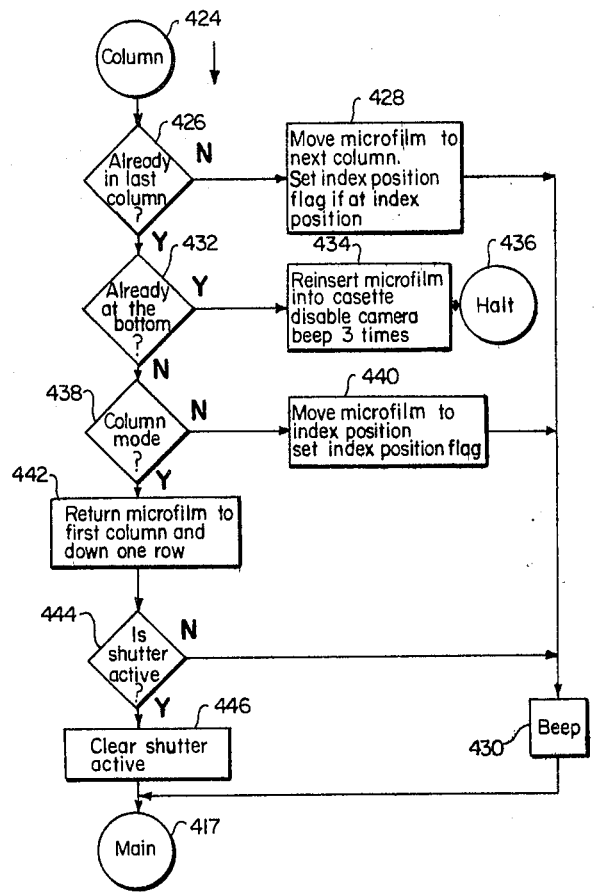

With reference to FIG. 11, the microprocessor 20 moves to step 426 to determine whether the last column of the microfilm 210 is already positioned over lens assembly 212. If it is not, the microprocessor 20 moves to step 428 and produces signals transmitted through stepper motor control circuit 28 to motors 166 and 208 causing the microfilm to be moved so as to position the adjacent frame in the next column over lens assembly 212. In addition, microprocessor 20 tests to see if the above-identified move would place the microfilm at the index position, and sets an internal "index position" flag if that is true. The microprocessor then moves to step 430 and produces a signal causing the sonalert to emit a single beep. Microprocessor 20 then returns to step 417.

In step 426 (FIG. 10) if the last column of the microfilm was found to be positioned over lens assembly 212, then microprocessor 20 moves to step 432 and examines whether the microfilm is positioned so that the bottom of the last column is positioned over lens assembly 212. If so, microprocessor 20 moves to step 434 and produces signals transmitted through motor control circuit 28 to motors 166 and 208 causing the microfilm to be reinserted in cartridge 194, produces signals to disable further camera system operation, and then causes the sonalert device to emit three beeps. Microprocessor 20 then moves to step 436 where it ceases further operation until a new filming operation is initiated.

Figure 10A:
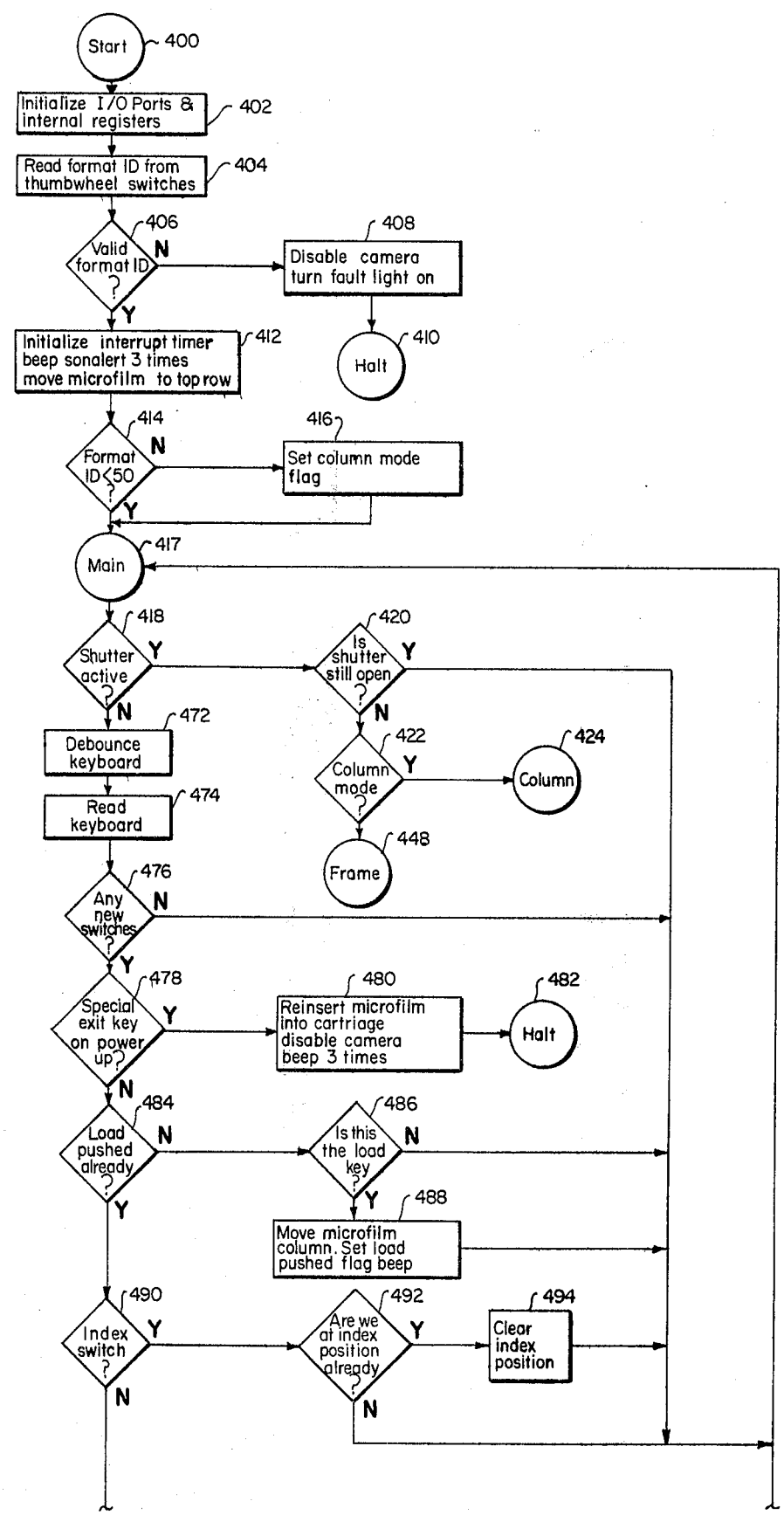
FIGS. 10-13 are flow diagrams illustrating one presently preferred method for programming and operating the microprocessor of the camera system in accordance with the method of the present invention.
Figure 10B:
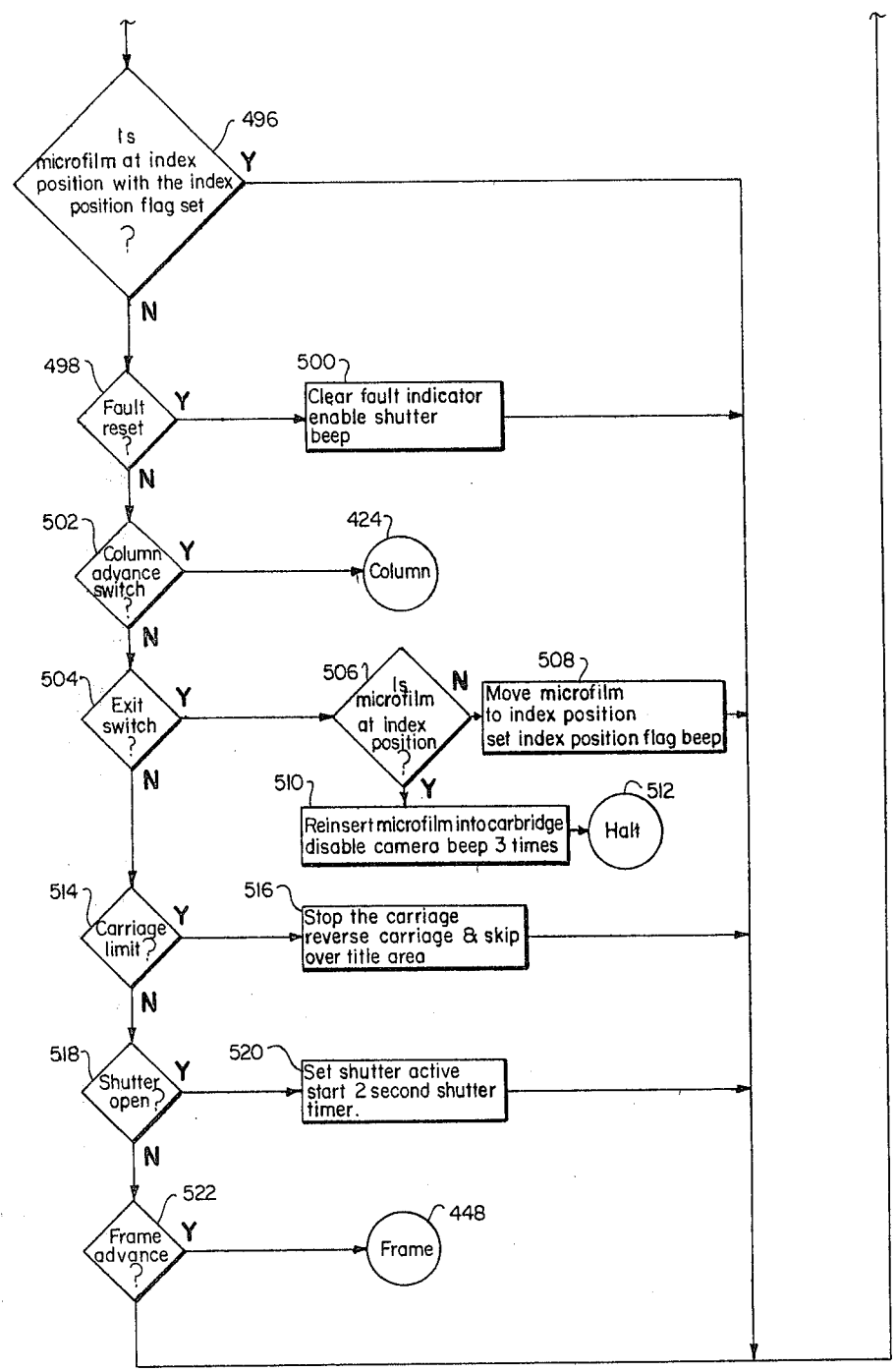

From step 432 if it is found that the microfilm 210 is not already at the bottom of a column, microprocessor 20 moves to step 438 where it determines whether or not the camera system is functioning in column mode. If it is not, microprocessor 20 moves to step 440 wherein it produces signals through stepper motor control circuit 28 to move microfilm 210 to the index position, and internally sets the "index position" flag. From this point microprocessor 20 moves to step 430, produces signals causing a beep on the sonalert and then returns to step 417 (FIG. 10*a*). From step 438, if the system is found to be in the column mode, then microprocessor 20 moves to step 442 and generates signals transmitted through motor control circuit 28 causing motors 166 and 208 to return the microfilm 210 to the first column and to also move it down one row.

Microprocessor 20 then moves to step 444 where it determines whether the shutter is opened and sets a flag.

If it is not, the microprocessor moves to step 430, transmits a signal causing a beep from the sonalert and then returns to step 417. If the shutter is found to be active, the microprocessor 20 proceeds to step 446 where it clears the "shutter active" flag and then returns to step 417.

Figure 12:
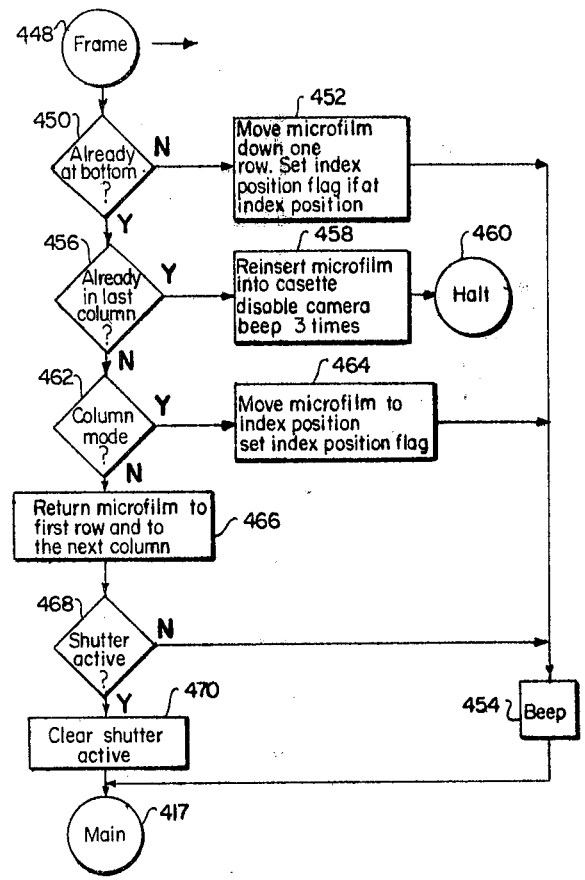
Figure 13:
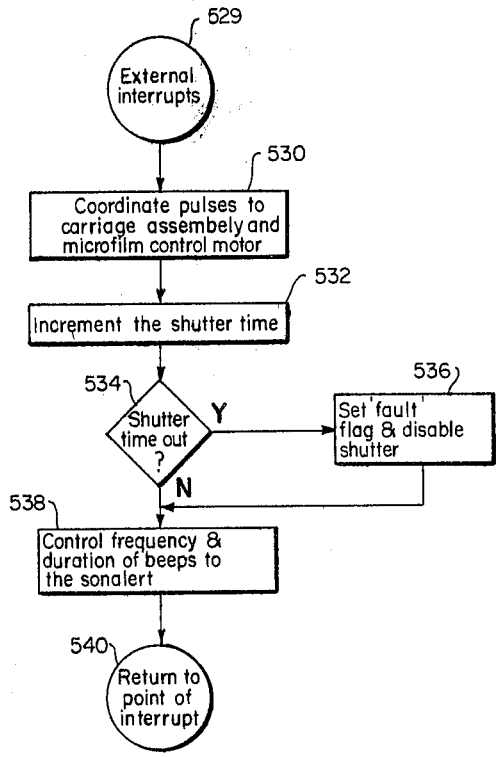

Referring again to step 422 of FIG. 10*a*, if it is determined that the camera system is not operating in the column mode, microprocessor 20 moves to step 448 and begins performing the frame subroutine as illustrated in FIG. 12.

By reference to FIG. 12, the microprocessor 20 moves to step 450 where it determines whether the microfilm 210 is already positioned at the bottom of a column. If not, microprocessor 20 produces signals transmitted through motor control circuit 28 to motors 166 and 208 causing the microfilm 210 to be moved down one row. Additionally, microprocessor 20 determines whether the microfilm 210 is at the index position, and if so it sets the "index position" flag. From step 452, microprocessor 20 proceeds to step 454 where it transmits signals causing a beep from the sonalert, and then it returns to step 417.

If in step 450 it is found that the microfilm 210 is already at the bottom of a column, microprocessor 20 moves to step 456 and examines whether the microfilm 210 is already in the last column. If so, microprocessor 20 moves to step 458 and produces signals transmitted through motor control circuit 28 to motors 166 and 208 causing the microfilm 210 to be reinserted into cartridge 194. Microprocessor 20 additionally produces signals disabling the camera system and causing the sonalert to beep three times. Microprocessor 20 then moves to step 460 and ceases further functioning until a new filming sequence is begun.

From step 456, it is found that the microfilm 210 is not already in the last column, microprocessor 20 moves to step 462 and examines whether the camera system is operating in the column mode. If so, microprocessor 20 moves to step 464 and causes the microfilm 210 to be moved to the index position. Additionally, microprocessor 20 sets the internal "index position" flag. From step 464, microprocessor 20 moves to step 454 and produces signals causing the sonalert to emit a single beep. The microprocessor 20 then returns to step 417.

If it is determined in step 462 that the camera system is not in the column mode, microprocessor 20 moves to step 466 and causes the microfilm 210 to be returned to the first row and to the next column.

From step 466 microprocessor 20 moves to the decision step 468 and determines whether the internal "shutter active" flag is set. If not, microprocessor 20 moves to step 454 and produces signals causing the sonalert to emit a beep, after which the microprocessor 20 returns to step 417. If in step 468 it is found that the shutter is active, the microprocessor 20 returns to step 470 and clears the "shutter active" flag. After this the microprocessor 20 moves to step 417 of the main program.

Referring once again to step 418 of the main program as illustrated in FIG. 10a, if it is found that the shutter is not active, the microprocessor 20 moves to step 472 where it waits momentarily to permit signals received from the input-output devices to debounce and become stabilized. The microprocessor 20 then moves to step 474 where it reads the signals received from the input devices. Subsequent to reading these signals, the microprocessor 20 moves to step 476 and determines whether any of the signals read in step 474 have been changed by the user. If not, the microprocessor returns to step 417 of the main program. If so, microprocessor 20 moves to step 478 where it examines whether the special exit key feature was activated. This feature provides that if the camera system is turned off or if there is a power interruption during camera operation, the microfilm 210 can be reloaded into the cartridge 194 by simply pressing the exit switch 130 after power has been restored to the camera system.

If the exit switch 130 has been activated following power up, microprocessor 20 moves to step 480 and causes the microfilm 210 to be reinserted into the cartridge 194. Additionally, the microprocessor 20 disables further camera operation and produces signals causing the sonalert to beep three times. From this point microprocessor 20 proceeds to step 482 and ceases further operation until a new filming process is initiated.

If it was determined in step 478 that the special exit key was not activated, microprocessor 20 moves to step 484 where it determines whether load switch 128 has been previously activated. If not, the microprocessor 20 moves to step 486 and tests to determine whether load switch 128 is presently being activated. If not, microprocessor 20 returns to step 417 of the main program.

From step 486, if it is determined that load switch 128 is presently being activated, microprocessor 20 moves to step 488 and causes the microfilm 210 to be moved to the first column. In addition, microprocessor 20 sets an internal "load pushed" flag and produces signals causing the sonalert to emit a beep. From this point microprocessor 20 returns to step 417 of the main program.

If it was determined in step 484 that the load switch 128 has previously been activated, then microprocessor 20 moves to step 490 where it determines whether index switch 132 is being activated. If so, microprocessor 20 advances to step 492 and determines whether the microfilm 210 is presently at the index position. If not, microprocessor 20 returns to step 417 of the main program. If so, then microprocessor 20 moves to step 494 and clears the index position flag. From this point microprocessor 20 returns to step 417 of the main program.

If it was determined in step 490 that the index switch 132 had not been activated, the microprocessor 20 moves to step 496 (see FIG. 10b) and determines whether the microfilm 210 is at the index position with the "index position" flag set. If so, microprocessor 20 returns to step 417. If not, the microprocessor 20 then moves to step 498 and determines whether the fault reset 134 has been activated. If so, the microprocessor 20 proceeds to step 500 where it produces signals which turn off fault indicator 122 and which enable operation of lens shutter 226. The microprocessor 20 then produces a beep on the sonalert and returns to step 417.

If it is found in step 498 that the fault reset 134 had not been activated, then the microprocessor proceeds to step 502 and determines whether the column advance switch 126 has been activated. If so, the microprocessor proceeds to step 424 which is the initial step of the column subroutine, as described in FIG. 11.

If the column advance switch 126 has not been activated, the microprocessor 20 proceeds from step 502 to step 504 and determines whether the exit switch 130 has been activated. If so, microprocessor 20 proceeds to step 506 and tests to see whether the microfilm 210 is positioned at the index position. If not, microprocessor 20 proceeds to step 508 wherein it causes the microfilm 210 to move to the index position. Additionally, microprocessor 20 sets the internal "index position" flag and produces signals causing the sonalert to produce a beep. From step 508 the microprocessor 20 proceeds to step 417 of the main program.

If it is found in step 506 that the microfilm 210 is at the index position, then microprocessor 20 proceeds to step 510 and causes the microfilm 210 to be reinserted into the cartridge 194. Additionally, microprocessor 20 disables further camera system operation and produces signals causing the sonalert to emit three beeps. The microprocessor 20 then proceeds to step 512 wherein it ceases all further operation until a new filming procedure is initiated.

If it is determined in step 504 that exit switch 130 had not been activated, microprocessor 20 proceeds to step 514 and determines whether there is a carriage limit signal being transmitted from carriage limit switch 230. This switch detects when the carriage assembly 176 has reached a specified position. If a signal is being received from limit switch 230 indicating that the carriage assembly 176 has traveled to a specified maximum position, then microprocessor 20 moves to step 516 and prevents any further advance of the microfilm 210 to new rows, and causes repositioning of the microfilm 210 so as to skip over the title area of the microfilm.

If it is determined in step 514 that no carriage limit signal was being produced, microprocessor 20 advances to step 518 and examines the signal received from the shutter limit switch 228 for detecting when the lens shutter 226 is open. If the shutter is found to be open, microprocessor 20 proceeds to step 520 and sets an internal "active flag", and additionally initiates a software timer having a time period of about two seconds. The microprocessor 20 then returns to step 417 of the main program.

If the lens shutter 226 is not found to be open in step 518, microprocessor 20 advances to step 522 and tests to determine whether the camera system is operating in the frame advance mode. If so, the microprocessor 20 proceeds to step 448 which is the initial step of the frame subroutine, as explained in FIG. 12. If the camera system is not operating in the frame advance mode, microprocessor 20 returns to step 417 of the main program and continues to operate in the loop function described above.

An external interrupt routine (see FIG. 13) is utilized to assist the program and subroutines of FIGS. 10-12. The external interrupt routine operates independently of the program and subroutines of FIGS. 10-12, with its execution being periodically initiated by an internal timer in the microprocessor 20.

When the external interrupt routine is activated by microprocessor 20, performance of all other functions in the program and subroutines of FIGS. 10-12 is caused to cease. The external interrupts routine then performs those of its operations which may have been called for by the program or subroutines up to the time of interrupt. Once the external interrupts routine is activated, microprocessor 20 moves to step 530. If the drive motors 166 and/or 208 are to be incremented, microprocessor 20 coordinates the production of pulse groups for accomplishing the incremental movement of the motors.

From step 530, microprocessor 20 moves to step 532 where, if lens shutter 226 is open, the internal shutter timer is incremented. Microprocessor 20 then moves to step 534 where it tests to determine whether the internal shutter time has reached its present time limit. If it is found that the lens shutter 226 has not closed, and that the shutter timer has reached its limit, microprocessor 20 proceeds to step 536 where it produces signals causing the illumination of fault indicator 122, and the disabling operation of lens shutter 226.

If in step 534 it is found that the shutter timer has not timed out, or after performing the tasks of step 536, microprocessor 20 advances to step 538. If the state of the program or subroutines of FIGS. 10-12 calls for beeping of the sonalert, then microprocessor 20 acts to control both the frequency and duration of beeps which are emitted by the sonalert.

From step 538 the microprocessor 20 moves to step 540 where execution of the external interrupts routine is terminated. Microprocessor 20 then moves to that step in the program and/or subroutines of FIGS. 10-12 in which the microprocessor 20 was functioning at the time of activation of the external interrupts routine.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer controlled microfilm camera system for use with reusable, single microfiche film cartridges, the system comprising:
   means for (a) at least partially withdrawing the film from said cartridge to permit exposure of said film, and for (b) thereafter reinserting said film back into said cartridge when finished with its exposure;
   first means for translating the film in incremental steps along a first direction corresponding to columns oriented with respect to said film;
   second means for translating the microfilm in incremental steps along a second direction corresponding to rows oriented with respect to said film;
   a pre-programmed microprocessor for (a) controlling the size of the incremental steps of the first and second means in response to format selection data input to said microprocessor by a system user, and for (b) controlling the order of movement of said film provided by said first and second means for purposes of exposing the film in either a row mode or a column mode in response to mode selection data input to said microprocessor by a system user;
   means for inputting data to the microprocessor; and
   means for focusing images onto the exposed portion of the microfilm.

2. The camera system defined in claim 1 wherein said focusing means comprises a removable lens and a shutter.

3. The camera system as defined in claim 2 further comprising:
   means for securing a portion of the film adjacent to the lens during exposure;
   means for electronically controlling the securing means and the shutter so as to expose the film for a specified time period in response to exposure data input to said electronic control means by a system user; and
   means for inputting exposure data to the electronic control means.

4. The camera system defined in claim 3 wherein said securing means comprises a solenoid-operated platen.

5. The camera system defined in claim 1 wherein said means for withdrawing and reinserting the microfilm comprisea a pair of rollers.

6. The camera system defined in claim 5 wherein said second means comprises a stepping motor for driving said rollers in response to commands from the microprocessor.

7. The camera system defined in claim 1 wherein said first means comprises a movable carriage assembly and a stepping motor for driving said carriage assembly in response to commands from the microprocessor.

8. A computer controlled microfilm camera system for use with pre-cut, single microfiche film sheets, the system comprising:
   a resuable film cartridge from which the single microfiche film may be withdrawn and reinserted, said cartridge being sealed from light to prevent unwanted exposure to said film when it is inserted into the cartridge;
   a first means for supporting the film cartridge in the camera system, said first means being movable so a to provide translational movement of the film in incremental steps along a direction corresponding to columns oriented with respect to said film;
   a second means for at least partially withdrawing the film from the cartridge to permit its exposure, and for thereafter reinserting the film back into the cartridge when finished with its exposure, said second means providing translational movement of the film in incremental steps along a direction corresponding to rows oriented with respect to said film;
   a pre-programmed microprocessor for (a) controlling the size of the incremental steps of the first and second means in response to format selection data input to said microprocessor by a system user, and for (b) controlling the order of movement of said film provided by said first and second means for purposes of exposing the film in either a row mode or a column mode in response to mode selection data input to said microprocessor by a system user;
   means for inputting data to the microprocessor; and
   means for focusing images onto the exposed portion of the film.

9. The camera system defined in claim 8 wherein said focusing means comprises a removable lens and a shutter.

10. The computer system defined in claim 9 further comprising:
    means for securing a portion of the film adjacent to the lens during exposure;
    means for electronically controlling the securing means and the shutter so as to expose the film for a specified time period in response to exposure data input to said electronic control means by a system user; and means for inputting exposure data to the electronic control means.

11. The computer system as defined in claim 10 wherein said securing means comprises a solenoid-operated platen.

12. The computer system as defined in claim 8 further comprising:

means for sensing the position of the said first means for supporting the film cartridge, and for producing an electronic signal when said supporting means arrives at a specified position; and means for calibrating the said sensing means for purposes of adjusting the position of said supporting means at which the electronic signal will be produced by the sensing means.

13. The computer system as defined in claim 12 wherein the sensing means comprises a photocell and means attached to the said supporting means for interrupting the light beam of the photocell when the supporting means arrives at the specified position.

14. The computer system as defined in claim 10 wherin the electronic control means additionally comprises means for (a) sensing the intensity of light at the plane of the image to be photographed and for (b) adjusting the time period for exposing the film to the image in response to the light intensity sensed.

15. The camera system as defined in claim 8 wherein the said first means for supporting the film cartridge comprises a movable carriage assembly and a stepping motor for driving the carriage assembly in response to pre-programmed commands from the microprocessor.

16. The camera system as defined in claim 8 wherein the said second means comprises a pair of rollers through which the film is pulled for purposes of withdrawing the film from the cartridge and reinserting the film back into the cartridge, and a stepping motor for driving the rollers in response to pre-programmed commands from the microprocessor.

17. The camera system as defined in claim 9 wherein the lens may be manually removed and replaced without disassembly of other portions of the said camera system.

18. The camera system defined in claim 8 wherein said cartridge is constructed from molded plastic.

19. The camera system defined in claim 8 wherein said cartridge comprises two halves which are joined about a portion of their peripheral edges by a tongue-and-groove means such that the two halves may be taken apart and put back together again for purposes of opening and closing the cartridge.

20. The camera system defined in claim 8 wherein said cartridge has an opening formed at one end thereof through which the sheet of film may be withdrawn and reinserted, said cartridge further comprising means for sealing the sheet of film at said opening to prevent exposure of the film to light prior to its withdrawal from the cartridge.

21. A computer controlled microfilm camera system for use with pre-cut, single microfiche film sheets, the system comprising:

a reusable film cartridge from which the single microfiche film may be withdrawn and reinserted, said cartridge being sealed from light to prevent unwanted exposure of said film when it is inserted into the cartridge;

a movable carriage assembly for supporting the film cartridge, said carriage assembly being movable so as to provide translational movement of the film in incremental steps along a direction corresponding to columns oriented with respect to said film;

a first drive mechanism and a first stepping motor connected through said first drive mechanism to said carriage assembly, said stepping motor moving the carriage assembly in incremental steps according to pre-programmed commands received from a microprocessor;

a pair of rollers mounted on said carriage assembly and situated so as to pull the film through the rollers for purposes of withdrawing the film from the cartridge and reinserting the film into the cartridge after its exposure, said rollers providing translational movement of the film in incremental steps along a direction corresponding to rows oriented with respect to said film;

a second drive mechanism and a second stepping motor connected through said second driving mechanism to said rollers, the second stepping motor driving the said rollers in incremental steps in response to pre-programmed commands from a microprocessor;

means for focusing images onto the exposed portion of the film, said focusing means comprising a pre-focused, removable lens and a shutter;

a pre-programmed microprocessor for (a) controlling the size of the incremental steps provided by said first and second stepping motors in response to format selection data input to said microprocessor by a system user, and for (b) controlling the order of movement of said carriage assembly and said rollers for purposes of exposing the film in either a row mode or a column mode in response to mode selection data input to said microprocessor by a system user; and means for inputting data to the microprocessor.

22. The camera system as defined in claim 21 further comprising:

a solenoid-operated platen for securing a portion of the film adjacent to the lens during exposure;

means for electronically controlling the solenoid-operated platen and the shutter so as to expose the film for a specified time period in response to exposure data to said electronic control means by a system user; and means for inputting exposure data to the electronic control means.

23. The camera system as defined in claim 22 wherein said electronic control means additionally comprises means for (a) sensing the intensity of light at the plane of the image, and for (b) adjusting the time period for exposing the film to the image in response to the level of light intensity sensed.

24. In a computer controlled microfilm camera system having a pre-programmed microprocessor, an input device electronically coupled to said microprocesor, means for withdrawing a single, pre-cut microfiche film sheet from a cartridge and for reinserting the sheet back into said cartridge, first means electronically coupled to said microprocessor for translating the said sheet in a first direction corresponding to rows oriented with respect to said sheet, and second means electronically coupled to said microprocessor for translating the said sheet in a second direction corresponding to columns oriented with respect to said sheet, a method of exposing the sheet of film comprising the steps of:

entering format selection data on the input device;

entering mode selection data on the input device;

activating the said withdrawing means in response to a pre-programmed command from the microprocessor so as to at least partially withdraw the sheet of film from the cartridge;

activating the said first means in response to a pre-programmed command from the microprocessor so as to automatically translate the sheet of film in incremental steps along the first direction;

activating the said second means in response to a pre-programmed command from the microprocessor so as to automatically translate the sheet of film in incremental steps along the second direction;

automatically selecting the size of the incremental steps along the first and second directions in response to the format selection data input by a system user;

automatically selecting the order of movement of the sheet of film provided by the first and second means for purposes of exposing said microfilm in either a row mode or a column mode in response to mode selection data input to said microprocessor by a system user; and activating the said reinserting means in response to a pre-programmed command from the microprocessor so as to automatically reinsert the sheet of film back into the cartridge when finished with its exposure.

25. The method as defined in claim 24 further comprising the steps of:

securing a portion of the sheet of film adjacent to a camera lens prior to opening the lens shutter;

automatically opening the shutter in response to a pre-programmed command from the microprocessor so as to expose the film; and releasing the secured portion of the film after exposure.

26. The method as defined in claim 25 wherein said step of opening the shutter so as to expose the film comprises the steps of:

sensing the level of light intensity at the plane of an image to be photographed; and controlling the period of time for which the shutter remains open in response to the level of light intensity sensed at the plane of the image and in response to exposure data entered by a system user through the said input device.

* * * * *

UNITED STATES PATENT AND TRADEMARK OFFICE
CERTIFICATE OF CORRECTION

PATENT NO. : 4,427,292
DATED : January 24, 1984
INVENTOR(S) : Vernon G. Buchanan It is certified that error appears in the above—identified patent and that said Letters Patent is hereby corrected as shown below:

```
Column 3, line 16, "After its exposure" should be
   --After its exposure,--
Column 3, line 61, "Figure 4a is a an" should be
   --Figure 4a is an--
Column 4, line 49, "explosures" should be --exposures--
Column 6, line 1, "electrically" should be
   --electronically--
Column 8, line 28, "cartridge" should be --carriage--
Column 8, line 39, "940L" should be --904L--
Column 10, line 38, "removeable" should be --removable--
Column 13, line 48 and 49, "embodment" should be
   --embodiment--
Column 15, line 14, "to hold" should be --in hold--
Column 18, line 11, "If it is not" should continue
   after previous sentence as part of same paragraph.
Column 22, line 17, "comprisea" should be --comprises--
Column 22, line 35, "so a" should be --so as--
```

Signed and Sealed this

Fourteenth Day of August 1984

[SEAL]

Attest:

GERALD J. MOSSINGHOFF

Attesting Officer

Commissioner of Patents and Trademarks